United States Patent
Keller et al.

(10) Patent No.: US 9,207,662 B2
(45) Date of Patent: Dec. 8, 2015

(54) SYSTEMS AND METHODS FOR MACHINING MATERIALS

(75) Inventors: David Keller, Charlotte, NC (US); Brett Brocato, Charlotte, NC (US)

(73) Assignee: FLIR Systems Trading Belgium BVBA, Meer (BE)

( * ) Notice: Subject to any disclaimer, the term of this patent is extended or adjusted under 35 U.S.C. 154(b) by 1320 days.

(21) Appl. No.: 12/935,633

(22) PCT Filed: Sep. 18, 2009

(86) PCT No.: PCT/US2009/057482
§ 371 (c)(1),
(2), (4) Date: Sep. 30, 2010

(87) PCT Pub. No.: WO2010/033805
PCT Pub. Date: Mar. 25, 2010

(65) Prior Publication Data
US 2011/0027032 A1   Feb. 3, 2011

Related U.S. Application Data

(60) Provisional application No. 61/098,065, filed on Sep. 18, 2008.

(51) Int. Cl.
*B24B 13/00* (2006.01)
*G05B 19/18* (2006.01)
(Continued)

(52) U.S. Cl.
CPC ............... *G05B 19/182* (2013.01); *B23Q 5/28* (2013.01); *B23Q 15/013* (2013.01);
(Continued)

(58) Field of Classification Search
CPC .............. B23Q 5/28; B23B 5/36; B28D 1/30; B24B 13/046
USPC .......................................... 82/1.11, 118, 137
See application file for complete search history.

(56) References Cited

U.S. PATENT DOCUMENTS 5,638,212 A   6/1997   Meyers et al.
5,923,561 A   7/1999   Higasayama et al.
(Continued)

FOREIGN PATENT DOCUMENTS

EP         0530032 A2    3/1993
EP         1162018 A1   12/2001
WO   WO 2008/020899 A2   2/2008

OTHER PUBLICATIONS

International Search Report mailed Jul. 28, 2010 corresponding to Application No. PCT/US2009/057482.
(Continued)

*Primary Examiner* — Will Fridie, Jr.
(74) *Attorney, Agent, or Firm* — Kilpatrick Townsend & Stockton LLP

(57) ABSTRACT

Embodiments of systems, methods, and computer-readable media for machining materials are disclosed. For example, one embodiment of the present invention includes a method for machining a feature on a work piece (100) along a curving tool path having the steps of controlling a relative translational movement between a tool table and the work piece (100) along the curving tool path and controlling a corresponding angle of rotation of the tool table with respect to the work piece (100) to maintain a substantially constant angle between the tool table and the corresponding relative translational movement between the tool table and the work piece (100) along the curving tool path. In another embodiment, a computer-readable media includes code for a carrying out such a method.

24 Claims, 12 Drawing Sheets

(51) Int. Cl.
   *B23Q 5/28* (2006.01)
   *B23Q 15/013* (2006.01)
   *B24B 13/04* (2006.01)
   *B29D 11/00* (2006.01)
   *B28D 1/00* (2006.01)

(52) U.S. Cl.
   CPC ....... B24B 13/046 (2013.01); B29D 11/00932 (2013.01); *G05B 2219/43129* (2013.01); *G05B 2219/45247* (2013.01); *G05B 2219/50353* (2013.01); *Y10T 409/30868* (2015.01); *Y10T 409/303752* (2015.01)

(56) References Cited

U.S. PATENT DOCUMENTS

| | | | |
|---|---|---|---|
| 7,089,836 B2 * | 8/2006 | Kato et al. | 82/1.11 |
| 7,597,033 B2 * | 10/2009 | Savoie et al. | 82/1.11 |
| 7,686,988 B2 * | 3/2010 | Hosoe | 264/2.5 |
| 7,736,552 B2 * | 6/2010 | Kimura | 264/2.5 |
| 7,762,165 B2 * | 7/2010 | Kimura | 82/1.11 |
| 8,656,815 B2 * | 2/2014 | Morimoto et al. | 82/1.11 |
| 8,662,959 B2 * | 3/2014 | Kuriyama et al. | 451/28 |
| 8,827,611 B2 * | 9/2014 | Trzaskos et al. | 409/293 |
| 2003/0127759 A1 | 7/2003 | Border et al. | |
| 2004/0113299 A1 * | 6/2004 | Hosoe | 264/2.5 |
| 2007/0295175 A1 | 12/2007 | Akiyama | |

OTHER PUBLICATIONS

Written Opinion of the International Searching Authority mailed Jul. 28, 2010 corresponding to Application No. PCT/US2009/057482.

Notification Concerning Transmittal of International Preliminary Report on Patentability mailed Mar. 31, 2011 corresponding to PCT Application No. PCT/US2009/057482.

* cited by examiner

SYSTEMS AND METHODS FOR MACHINING MATERIALS

CROSS-REFERENCE TO RELATED APPLICATIONS

This application claims priority to U.S. provisional patent application Ser. No. 61/098,065, filed Sep. 18, 2008, entitled "Systems and Methods for Machining Materials," which is incorporated herein by reference.

BACKGROUND

There are many known systems and methods for machining various materials. Programmable computer controls have been used in combination with machining tools to increase the efficiency of machining processes (such as by reducing the amount of skilled labor involved) and to increase the dimensional accuracy or desired characteristics of a machined feature on a resulting work piece. Various methods for machining materials have their individual strengths and weaknesses, and thus may be best suited, alone or in combination, for one application but less well suited for another. A need exists for efficient and effective systems and methods for machining materials.

SUMMARY

Embodiments of the present invention provide systems and methods for machining materials. In one embodiment, a method for machining materials comprises controlling both a relative translational movement between a tool table and a work piece along a curving tool path and a corresponding angle of rotation of the tool table with respect to the work piece to maintain a substantially constant angle between the tool table and the corresponding relative translational movement between the tool table and the work piece along the curving tool path. Another embodiment comprises controlling a dynamic feed rate of a tool table along a curving tool path to substantially maintain a target centripetal acceleration of the tool table with respect to a work piece. One embodiment of a method for scribing a desired feature into a work piece may be effected using such a CNC machining apparatus in order to remove material from the work piece and thereby create a desired feature with a high-quality surface (for example, with a reduction in tool marks on the surfaces created that are not part of the design). Additionally, usage of embodiments such a scribing method can create a continuous or substantially continuous chip of machined waste material, making cleaning of the work piece easier than with methods such as micro-milling that create numerous smaller waste material chips that may be difficult to remove from the finished work piece's surface. An additional benefit of some embodiments is the slower relative velocity between a cutting edge of a tool used for a scribing process and a work piece being machined (when compared with micro-milling processes), which can lower the kinetic energy generated during chip formation that must be dissipated by heat. Such a reduction in heat generated by a scribing process can reduce the rate of tool wear.

These illustrative embodiments are mentioned not to limit or define the invention, but to provide examples to aid understanding thereof. Illustrative embodiments are discussed in the Detailed Description, and further description of the invention is provided there. Advantages offered by the various embodiments may be further understood by examining this specification.

BRIEF DESCRIPTION OF THE DRAWINGS

These and other features, aspects, and advantages of embodiments of the present invention are better understood when the following Detailed Description is read with reference to the accompanying drawings, wherein.

DETAILED DESCRIPTION

Embodiments of the present invention comprise systems and methods for machining materials. Systems and methods according to the present invention may be embodied in a number of ways. Generally, one or more machining systems or methods are selected by a user in order to most quickly and cost-effectively create a finished work piece comprising all desired features, characteristics, and tolerances while minimizing steps, wasted efforts, and excess materials. It is also desirable to use systems and methods that may help to prolong the expected life of the components and tools involved.

Certain embodiments of the present invention may, for example, be used to machine features on a nickel or brass replication master that have been designed for use in the production of an array of lenses (or component portions thereof) that provide an optical effect and can be incorporated in miniature image capture devices. Arrays of optics for other applications, including for example, communications, data storage, and semiconductor manufacturing may be produced using fabrication masters that are machined according to embodiments disclosed herein. Further description of the use of fabrication masters in the production of image capture devices is provided by PCT International Publication Number WO 2008/020899 A2, entitled "Arrayed Imaging Systems and Associated Methods," the entire disclosure of which is incorporated by reference herein as if fully set forth below.

Figure 1:
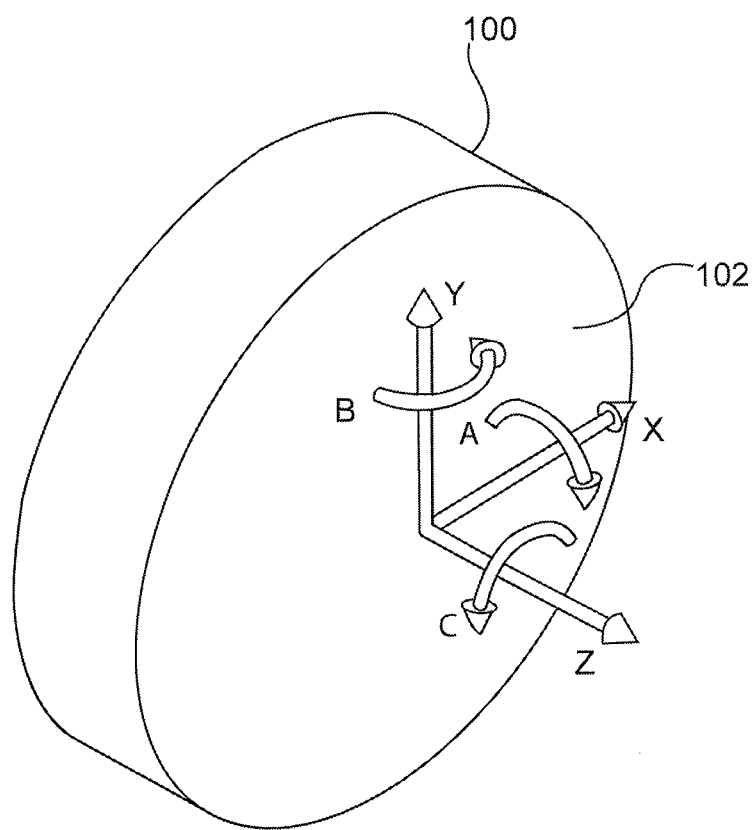
FIG. 1 is an illustration of a work piece to be machined illustrating the relation of X-, Y-, Z-, A-, B-, and C-axes thereto.

Referring now to FIG. 1, an illustration of a cylindrical work piece 100 to be machined is shown. The work piece 100 comprises a substantially planar surface 102 to be machined. In other embodiments a surface of a work piece to be machined may comprise other surface shapes, features, or qualities. For example, such a surface may comprise a convex, concave, aspheric, irregular, ridged, cross-hatched, or other shape, feature, or quality. In one example, a work piece may have an array of features such as recesses or protrusions that are further machined using techniques disclosed herein.

FIG. 1 illustrates the relation of six different axes, labeled "X," "Y," "Z," "A," "B," and "C" with relation to the surface 102 of the work piece 100. The X-axis is parallel to the surface 102 of the work piece 100. The Y-axis is also parallel to the surface 102 of the work piece 100, and is normal to the X-axis. The Z-axis is normal to both the X- and Y-axes, as well as to the surface 102 of the work piece 100. The A-axis is circular about the X-axis. Similarly, the B-axis is circular about the Y-axis, and the C-axis is circular about the Z-axis.

In the discussion of various embodiments described below, reference to any one or more of the X-, Y-, Z-, A-, B-, or C-axes should be interpreted to be consistent with the orientation of these axes as depicted in FIG. 1. In other embodiments, alternative coordinate systems or points of reference may be used. For example, cylindrical or spherical coordinate systems could be used either alone or in conjunction with each other or with a coordinate system as depicted in FIG. 1. In another embodiment, the axes could be described with reference to the machining equipment used, for example.

Examples of Systems for Machining Materials

Figure 2:
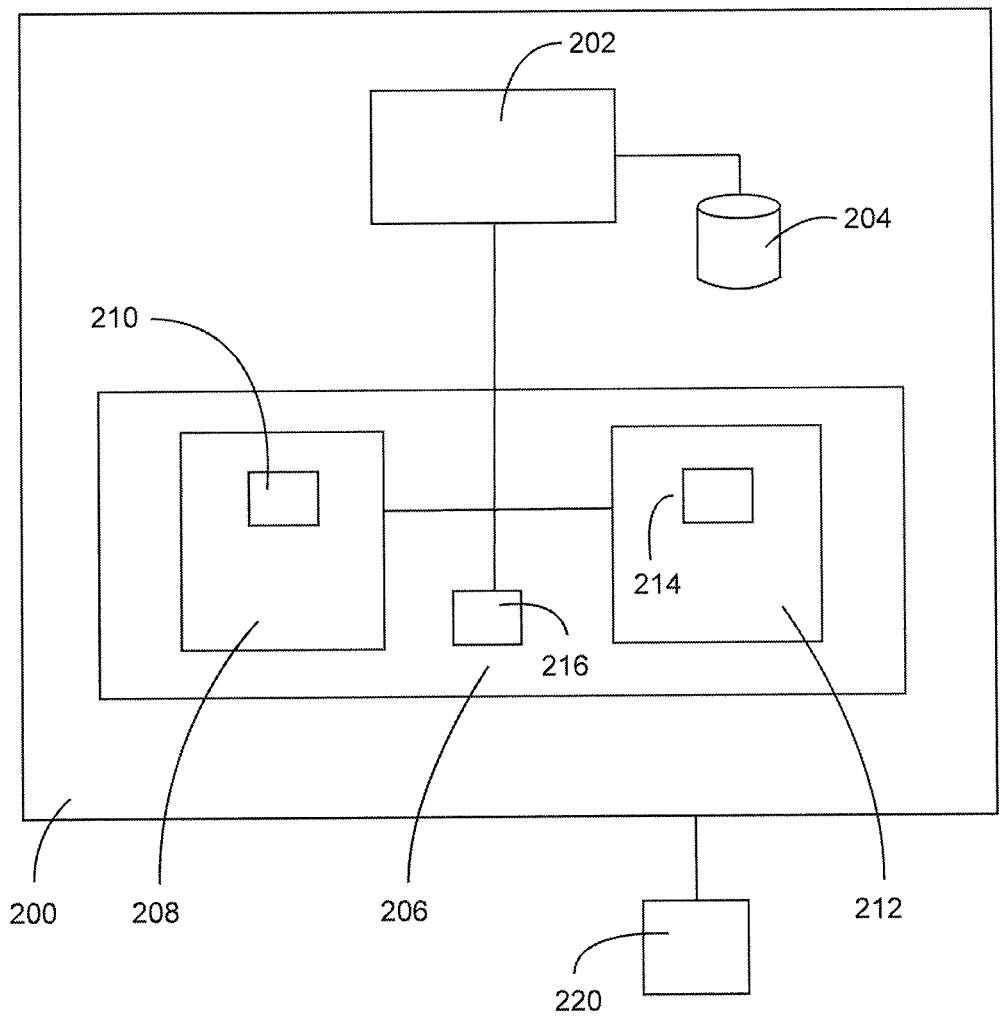
FIG. 2 is a block diagram of a system for machining materials according to one embodiment.

Referring now to FIG. 2, a block diagram of a system 200 for machining materials according to one embodiment is shown. The system 200 comprises a digitally automated CNC (computer numerical control) machining apparatus having multiple controllable components. In other embodiments, a system for machining materials may comprise a manually operated system or a mechanically automated system. Referring still to FIG. 2, the system 200 shown may comprise, for example, a precision turning tool such as a Precitech Nanoform 700 Ultra four-axis diamond turning machine or the Nanotech 350FG three-axis ultra precision freeform generator with optional C rotary axis, available from Moore Nanotechnology Systems LLC, 426A Winchester Street, PO Box 605, Keene, N.H. 03431-0605 USA, phone 1-603-352-3030. In one such embodiment, a standard tool holder platform may be modified to receive and hold a work piece while a standard work piece holder platform may be modified to receive and hold a tool, such as a dead sharp diamond turning tool or a radiused diamond tool.

The system 200 shown in FIG. 2 comprises a programmable computer 202 or processor configured to control the other components of the system 200 by sending and receiving signals and electrical currents therebetween. For example, one or more PC-compatible computers as are widely available from many vendors such as Compaq, Toshiba or Gateway may be used to execute a program and control other components of the system 200. In other embodiments the computer 202 may comprise a pre-programmed computer chip configured to carry out a defined set of control operations to control other components of the system 200. The computer 202 may have a user interface comprising an input device (such as a touch screen monitor or a keyboard with a regular monitor) that may be used by a user to instruct or program the computer 202.

The computer 202 is in communication with storage medium 204. Storage medium 204 may comprise, for example, a hard drive. Storage medium 204 is configured to store computer programs designed to, when executed by computer 202, control the operation of other components of the system 200 to carry out a machining process in a defined manner. In some embodiments, the computer 202 may be in communication (e.g., over a LAN or WAN) with one or more other computer devices and storage media, and may be configured to receive and carry-out one or more instructions or programs via such a network. The computer 202 may also have a reader configured to receive a data storage device (such as a flash memory card or DVD-ROM) programmed with a set of instructions for the computer 202.

The computer 202 is also in communication with a set of controllable components 206. In the present embodiment, the components 206 comprise a tool holder platform 208 configured to hold and manipulate a tool 210, and also a work piece holder platform 212 configured to hold and manipulate a work piece 214. In other embodiments, the components 206 may be greater or fewer in number, and may have additional controllable features or directions of controllable movement than what is described below. The platforms 208, 212 may both comprise one or more metal stages on tracks and are isolated from each other and the ground on beds or bladders of pressurized air or liquid. The platforms 208, 212 may be connected to electric motors (such as DC or AC motors) or piezo-electric actuators configured to move at least a portion of the platforms 208, 212 in one or more directions in response to electrical signals and current controlled by the computer 212 in response to execution of a program stored in memory 204.

In one embodiment, the tool holder platform 208 is configured to control the movement of the tool 210 about the X-, Y-, and C-axes, while the work piece holder platform 212 is configured to control the movement of the work piece 214 about the Z-axis. In another embodiment, the tool holder platform 208 may be configured to control the movement of the tool 210 about the X-, Y-, Z-, and C-axes while the work piece holder platform 212 may be stationary. In yet another embodiment, the tool holder platform 208 may be configured to control the movement of the tool 210 about the C-axis while the work piece holder platform 212 may be configured to control the movement of the work piece 214 about the X-, Y-, and Z-axes. In yet another embodiment, the tool holder platform 208 may be configured to control the movement of the tool 210 about the Z- and C-axes while the work piece holder platform 212 may be configured to control the movement of the work piece 214 about the X- and Y-axes.

In other embodiments yet other suitable alternative configurations of tool holder platforms 208 and work piece holder platforms 212 may be used. For example, in an embodiment in which a vertical milling device is used, the tool holder platform 208 may be configured to control the movement of the tool 210 about the X-, Z-, and B-axes, while the work piece holder platform 212 may be configured to control the movement of the work piece 214 about the Y-axis. In another embodiment, a vertical milling device may be configured with a work piece holder platform 212 configured to control the movement of the work piece 214 about the X- and Y-axes and a tool holder platform 208 configured to control the movement of the tool 210 about the Z- and C-axes. In yet another embodiment, a horizontal milling device can be used wherein the work piece holder platform 212 may be configured to control the movement of the work piece 214 about the X-, Y-, and C-axes, while the tool holder platform 208 is configured to control the movement of the tool 210 about the Z-, and C'-axes (wherein the C'-axis has an origin corresponding to the location of the tool holder platform 208).

Referring still to FIG. 2, the controllable components 206 of the system 200 further comprise a lubrication system 216 controlled by the computer 202. The lubrication system 216 can be configured to provide a liquid or gaseous material with lubricating properties to an area where the tool 210 makes contact with the work piece 214 in order to keep the operating temperatures of the tool 210 and the work piece 214 within parameters suitable for the materials involved, prolong the life of the tool 210, prevent damage to the work piece 214, or carry away debris and chips of waste material resulting from a machining process. For example, the lubrication system 216 may comprise an electric pump in communication with the computer 202, along with tubing connected to the pump that is configured to deliver the lubricant material from a reservoir to one or more nozzles positioned to spray the lubricant onto the location where the tool 210 makes contact with the work piece 214.

In some embodiments other components may be used as part of the controllable components 206, such as a recirculating coolant system designed to limit the operating temperature of an electric motor (such as a motor used to effect a movement of the tool holder platform 208 or the work piece holder platform 212) to below a predetermined value.

The system 200 draws power from a power source 220. The power source 220 may comprise, for example, AC power at 120V or 220V. In another embodiment the power source 220 may comprise a DC power source (for example a NiMH battery).

Figure 3A:
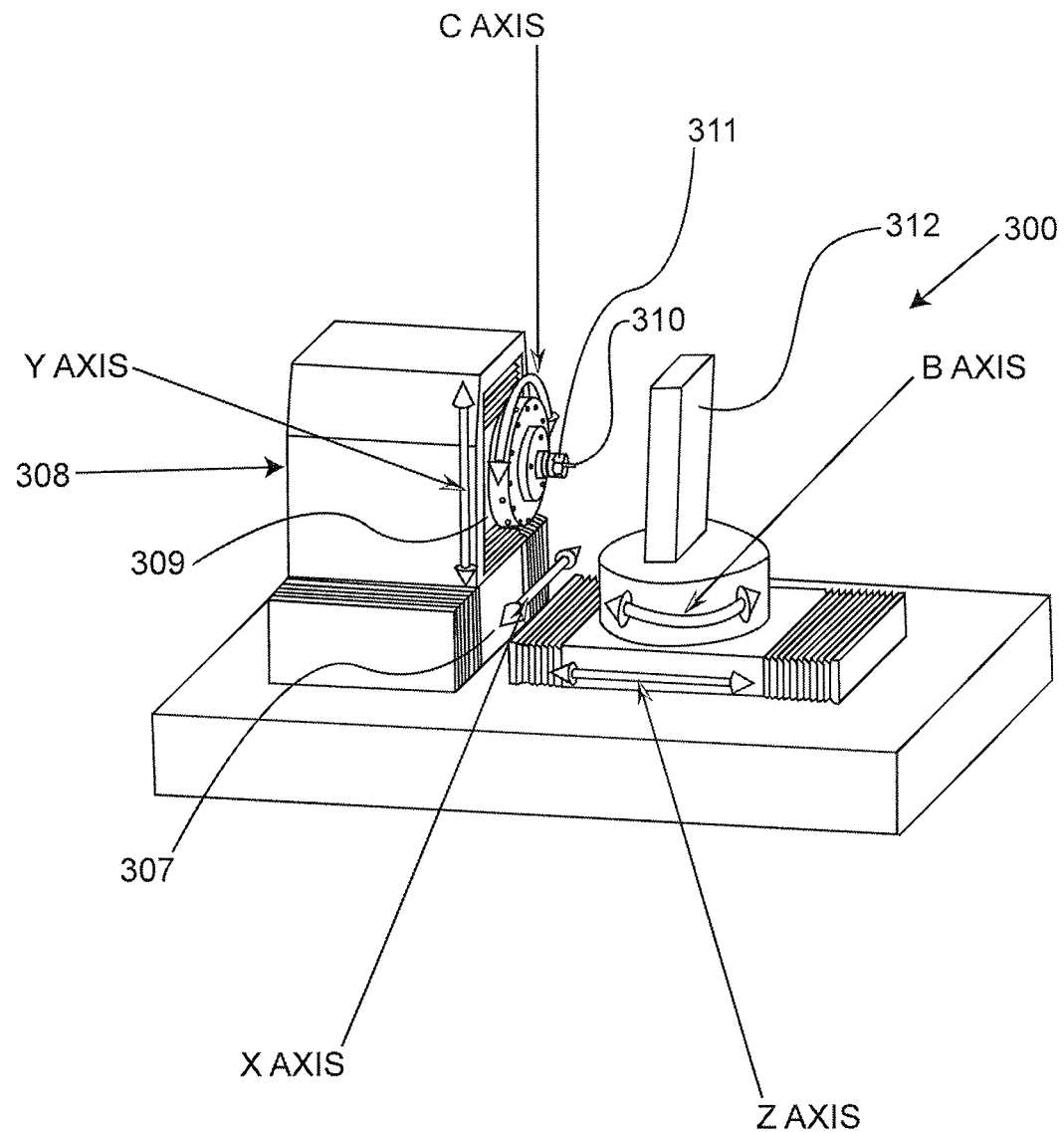
FIG. 3A is a side perspective of an illustration of a system for machining materials according to one embodiment.

Referring now to FIG. 3A, a side perspective of a portion of a system 300 for machining materials is shown according to one embodiment. The system 300 comprises a tool holder platform 308. The tool holder platform 308 is comprised of movable platforms 307, 309, 311. Movable platform 307 is movable and controllable only along the X-axis as depicted on FIG. 3. Movable platform 309 is movable and controllable only along the Y-axis as depicted on FIG. 3. Movable platform 311 comprises a tool spindle configured to hold a tool 310 that is movable and controllable around the C-axis as depicted in FIG. 3.

The tool 310 may comprise any suitable cutting tool. For example, the tool 310 may be fabricated from tool steel, high speed steel, tantalum carbide, titanium carbide, tungsten carbide, titanium nitride, a ceramic material, or natural or synthetic diamond. In one embodiment the tool 310 may comprise an ultra-precision machining single point diamond turning hemisphere or concave asphere tool comprising a 200 micron radius as is available from Chardon Tool, PO Box 291, 115 Parker Court, Chardon, Ohio 44024 USA, phone 1-440-286-6440. In another embodiment, the tool 310 may comprise a fast-tool servo tool as available from TechnoDiamant.

Tool holder platform 308 is configured such that each of the movable platforms 307, 309, 311 is separately controllable. Movement of movable platform 307 along the X-axis will also result in a movement of platforms 309, 311 and tool 310 along the X-axis. Movement of movable platform 309 along the Y-axis will also result in a movement of platform 311 and tool 310 along the Y-axis. Rotation of movable platform 311 around the C-axis will result in the rotation of the tool 310 around the C-axis. In this manner, the location and angle of a cutting surface of the tool 310 can be controlled by positioning the C-axis with respect to the X- and Y-axis positions. A program can thus be written that describes a cutting path for the tool 310 that specifies a C-axis coordinate for each set of X-Y coordinates.

The system 300 further comprises a work piece holder platform 312. In the system 300 shown in FIG. 3, the work piece holder platform 312 is movable and controllable along the Z-axis and around the B-axis as depicted in FIG. 3. In this manner the relative translational and rotational movements between a cutting surface of the tool 310 and a surface of a work piece mounted in the work piece holder 312 can be controlled with respect to the X-, Y-, Z-, B- and C-axes. Depending on the types of features being machined, the shape of the work piece being machined, or other constraints, in other embodiments, additional movable platforms may be added in order to provide additional directions and angles of rotation between the tool 310 and the work piece.

Figure 3B:
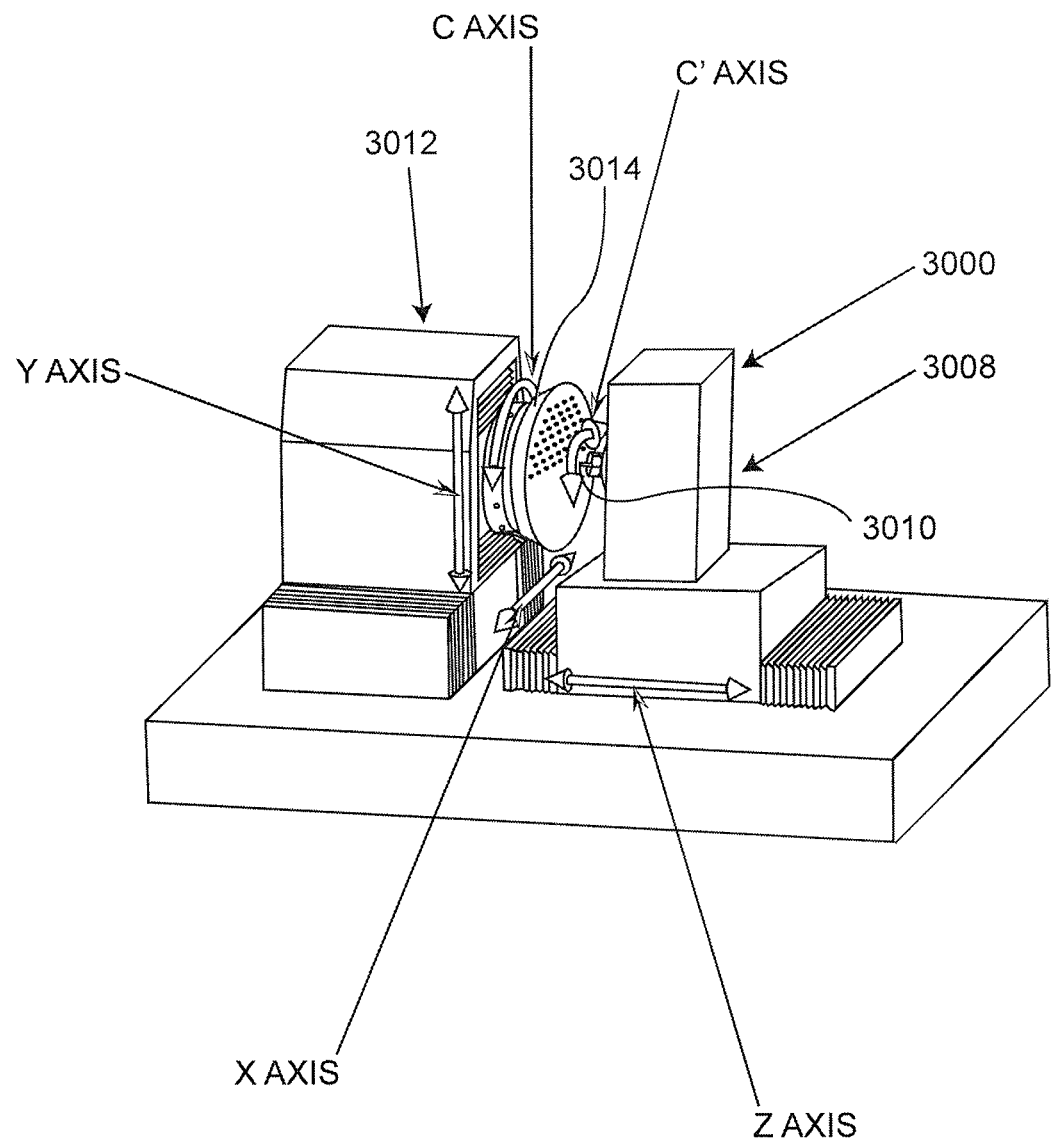
FIG. 3B is a side perspective of an illustration of a system for machining materials according to one embodiment.

Moreover, in other embodiments, a work piece holder may be configured in a manner such that a work piece coupled thereto can be movable and controllable along another or an additional axis or axes. For example, a system 3000 is shown in FIG. 3B, wherein a work piece 3014 is shown mounted to a work piece holder platform 3012 that is configured to be controlled with respect to the X-, Y-, and C-axes, while a tool holder platform 3008 is shown having been configured to be controlled with respect to the Z-axis and a C'-axis, where the C'-axis is parallel to the C-axis. In such an embodiment, a tool 3010 mounted in the tool holder platform 3008 may be rotated about the C'-axis while the work piece 3012 may be independently rotated about the C-axis, for example to increase the machinable area of the work piece 3012.

Figure 4:
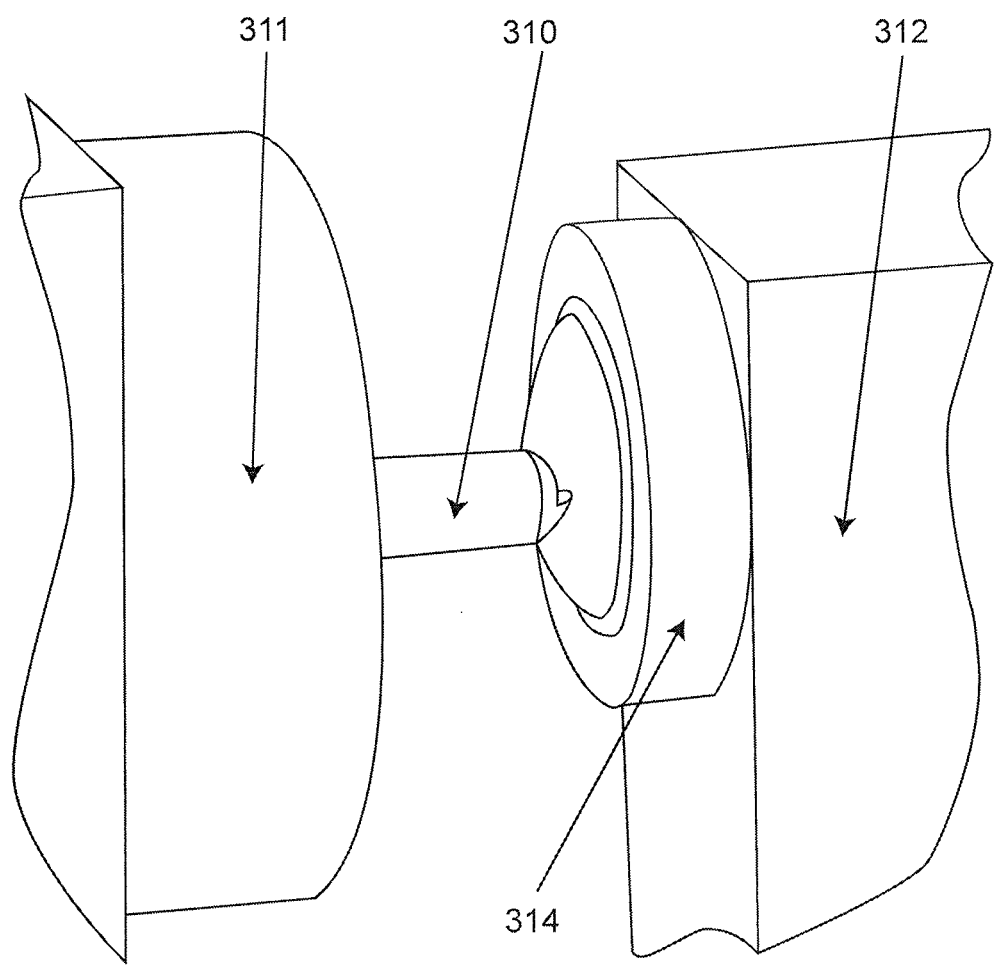
FIG. 4 is a side perspective of an illustration of a work piece and tool mounted in a system for machining materials according to one embodiment.

Referring now to FIG. 4, a side perspective of an illustration of a work piece 314 and a tool 310 mounted in the system 300 shown in FIG. 3 is shown according to one embodiment. As shown in FIG. 4, work piece 314 has been securely mounted to work piece holder platform 312. Work piece 314 comprises a substantially-cylindrical shaped object with a convex surface onto which features may be scribed by the tool 310. As shown in FIG. 4, the tool 310 comprises a radiused diamond turning tool. In other embodiments other types of tools can be used, such as a dead sharp single point natural diamond cutting element configured to be used in single point diamond turning (SPDT) operations.

As described above and shown with respect to FIG. 4, the relative position of the cutting surface (tool table) of the tool 310 with respect to a surface to be machined of the work piece 314 may be controlled with respect to the X-, Y-, Z-, and C-axes. Thus a scribing process such as is described below may be performed whereby the rotation of the tool 310 with respect to the C-axis is synchronized at every point during the process with an angle defined by the tool's 310 X-Y position with respect to a localized X-Y-Z origin associated with the center of a feature to be machined. Thus the tool's 310 tool table (also sometimes referred to as a rake face) can be maintained in some embodiments in a substantially perpendicular orientation to tool's 310 translational movements along a curving tool path with respect to the work piece 314. In this manner, material may be removed from the work piece 314 along a direction that is substantially parallel to the tool's 310 translational movements along the cutting path. In other embodiments, the tool's 310 orientation with respect to the work piece 314 may be adjusted to provide a suitable rake, roll, and/or tilt angle. For example, some features may require a greater depth of cut or slope angles than would be able to be provided by maintaining a substantially perpendicular orientation between the tool table of the tool 310 and the work piece 314. Additionally, for machining some crystalline materials, it may be more suitable to maintain a known rake, roll, and/or tilt angle between the tool table of the tool 310 and the work piece 314.

The example systems (200, 300) described above that can be used to effectuate present systems and methods for machining materials are given to introduce the reader to the general subject matter discussed herein. The disclosure is not limited to these examples. Further details regarding various embodiments of systems and methods for machining materials are described below.

Example Methods for Machining Materials

Figure 5:
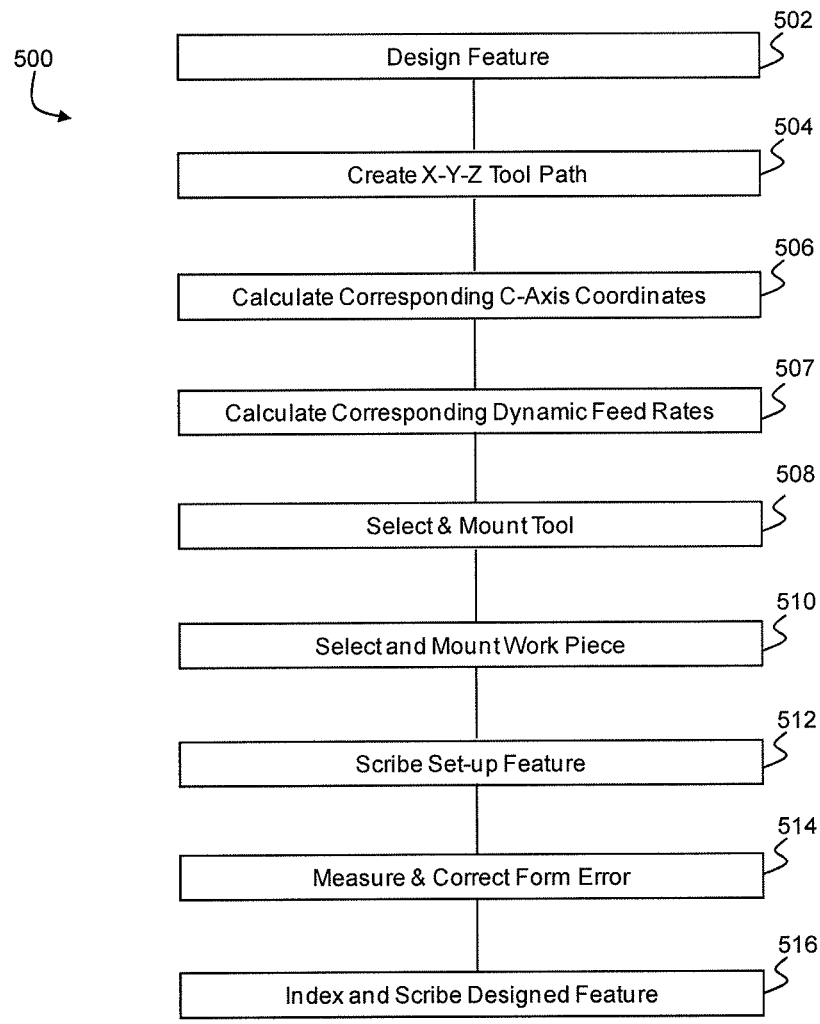
FIG. 5 is a flow diagram of a method for machining materials according to one embodiment.

Referring now to FIG. 5, a flow diagram of a method 500 for machining materials according to one embodiment is shown. In step 502, the method 500 comprises the step of designing a feature to be machined. For example, a user could use a 2-D or 3-D computer aided design and modeling program (such as AutoCAD, Autodesk Inventor, SolidWorks, or Parametric Technology Corporation's Pro/ENGINEER) to design one or more features to be machined. Features could comprise, for example, features to be used in the molding of portions of wafer-scale refractive, reflective, or diffractive lenses. In one such embodiment, optical surface features may be designed using commercially-available computer aided optics design tools such as CODE V from Optical Research Associates or ZEMAX from Zemax Development Corp.

In step 504, the method 500 comprises the step of creating a curving X-Y-Z tool path. For example, in one embodiment, this can comprise creating a computer program to be executed by a CNC machining system in order to create the feature designed in step 502. For example, one or more commercially-available computer-aided manufacturing programs may be used to create or translate such a program—such as SolidCAM, Parametric Technology Corporation's Pro/ENGINEER software, Camtek's PEPS software, or DIFFSYS software developed by Western Isle Ltd., North Wales, Great Britain.

In step 506, the method 500 comprises the step of determining corresponding C-axis coordinates for the curving X-Y-Z tool path created in step 504. For example, in one embodiment, The Mathworks' MATLAB programming language and functionality can be used to create a post-processing routine that uses a milling program's output (for example, a DIFFSYS milling program defining an X-Y-Z tool path wherein the X, Y, and Z characters have been replaced with commas) as an input to calculate a set of C-axis angles and dynamic feed rates associated with each X-Y-Z coordinate along one or more tool paths. In one such embodiment, MATLAB's atan2 four-quadrant inverse tangent function can be used to calculate the corresponding C-axis coordinates for each set of X-Y-Z coordinates. In one embodiment the C-axis coordinates can be configured to control an angle of rotation of a tool table with respect to a work piece being machined to maintain a substantially constant angle (for example, a perpendicular relationship) between the tool table and the corresponding relative translational movement between the tool table and the work piece along the curving X-Y-Z tool path created in step 504.

In step 507, the method 500 comprises the step of determining corresponding dynamic feed rates for the X-Y-Z tool path created in step 504. In some embodiments, the dynamic feed rate can be programmed to vary along a curving tool path, for example, as a function of a varying radius of curvature of the curving X-Y-Z tool path. Varying the feed rate along the curving X-Y-Z tool path can serve various purposes, such as to increase machining accuracy, account for limitations and inaccuracies in machine performance limits or control systems or algorithms, reduce undesirable machining by-products such as motion errors, decrease the amount of time required to machine a feature onto a work piece, stabilize machine and control systems dynamics over a large range of tool path radii of curvature, and/or minimize the dynamic effects of a relatively heavy work piece and/or tool-holding spindles.

For example, in one embodiment, a linear dynamic feed rate can be calculated using a program to perform the necessary calculations programmed using a general-purpose software development system (such as Matlab, Labview, or a C-language compiler) for each X-Y-Z coordinate along one or more curving tool paths in order to substantially maintain a target centripetal acceleration of the tool with relation to the work piece, or of the work piece with relation to the tool, depending on the machining apparatus set-up used, along the tool path's changing radius of curvature.

In one such embodiment, determining a set of dynamic feed rates comprises determining a target centripetal acceleration and obtaining a set of X, Y, and Z tool path coordinates for a desired machined feature profile from a CAM system, such as DIFFSYS, where the tool path coordinates consist of X, Y, and Z positions in a "comma separated value" (CSV) format.

A target centripetal acceleration can be determined, for example, by performing one or more data acquisition machining cuts for a desired feature on the machining system to be used, and reviewing the results to determine a tangential velocity and tool path radius that does not cause excessive axis following error on the computer-controlled machining system in question. Once an appropriate tangential velocity and tool path radius for the particular machining system has been identified, the target centripetal acceleration can be calculated by dividing the square of the known tangential velocity by the known tool path radius.

In some embodiments, determining a target centripetal acceleration can comprise adding a function of a tool path's radius of curvature to the square of the tangential velocity divided by the tool path's radius of curvature in order to decrease the amount of time required for a machining process.

Still referring to FIG. 5, and particularly Step 507, once a target centripetal acceleration has been determined, a tool path post-processing routine can be used to calculate a set of dynamic feed rates in order to substantially maintain the target centripetal acceleration along at least a portion of the known tool path. For example, determining the dynamic feed rates can comprise reading the known X, Y, and Z coordinates of the programmed tool path, determining a set of tool path radii of curvature for each set of X-Y-Z coordinates, and then determining a set of tangential velocities for each of the X-Y-Z coordinates along the tool path by taking the square root of the product formed by multiplying the target tangential acceleration with the calculated tool path radii of curvatures for each set of X and Y coordinates.

Once the set of tangential velocities along the tool path for each set of X and Y coordinates along the X-Y-Z tool path has been calculated, a set of dynamic feed rates associated with each such tangential velocity can be calculated, for example by using DIFFSYS.

In such an embodiment, once a set of dynamic feed rates configured to substantially maintain the target centripetal acceleration along at least the desired portion of the X-Y-Z tool path has been calculated for each of the X-Y-Z coordinates, a new machine tool numerical control program file usable in a CNC machining system (such as the Nanotech 350FG) can be compiled that includes X, Y, and Z coordinates in addition to the calculated X- and Y-axis feed rate terms and any C-axis coordinates calculated as described above with respect to step 506. In other embodiments the C-axis coordinates or dynamic feed rates can be calculated manually for some or all of the known X-Y-Z coordinates along the tool path created in step 504.

In step 508, the method 500 comprises the step of selecting and mounting a tool to be used in the machining process. For example, in one embodiment the tool may comprise a dead sharp single point natural diamond cutting element configured to be used in diffractive single point diamond turning (SPDT) operations. In another embodiment the tool may comprise a tool 310 as described with respect to FIG. 3, and may be securely mounted to a rotational positioning axis, such as the spindle 311 as shown in FIGS. 3 and 4 that is part of the movable tool holder platform 308 of system 300. So mounted, the tool may be controllable in the X-, Y-, and C-axes as is the tool 310 of system 300. In other embodiments, for example, the tool selected may comprise a milling tool, or a diamond having a radiused cutting edge profile, and may be mounted in a tool holder (such as a tool post or high-speed spindle) in a different configuration providing different or additional directions of controllable motion.

In step 510, the method 500 comprises the step of selecting and mounting a work piece to be machined. For example, in one embodiment the work piece may comprise a cylindrical-shaped piece of nickel comprising an eight-inch diameter and a substantially planar surface to be machined. In other embodiments work pieces of different sizes (for example, a 300-mm diameter), shapes, materials, and surface characteristics may be used. For example, in one embodiment, a work piece may comprise a work piece similar to the work piece 314 shown mounted to the work piece holder 312 in FIG. 4. In yet another embodiment a work piece comprised of a glass material may be mounted for machining. In yet another embodiment a work piece may comprise a surface that has previously been machined using another process (for example, a fast tool servo process or a micro-milling process) in order to provide a surface onto which additional features can be machined using a scribing process. In one embodiment a first work piece (such as a scrap or defective part) may be mounted in order to machine a set-up feature that is not intended to be part of a finished work piece product. In such an embodiment the first work piece can be removed once the set-up feature has been scribed, and can be replaced with a second work piece that is intended for later use.

The work piece may be securely mounted to a movable work piece holder platform, such as the platform 312 described above with respect to system 300 in FIG. 3. For example, a strong vacuum can be provided between the work piece mounted to the work piece holder to secure the work piece to the holder platform. In another embodiment, one or more mechanical clamps or vises may be used to secure a work piece to a work piece holder.

In step 512, the method 500 comprises the step of scribing a set-up feature into the work piece about a first localized X-Y-Z coordinate axis. For example, in one embodiment a set-up feature may approximate at least a portion of the feature designed in step 502 in order to evaluate the set-up of the tool in the CNC machine. In another embodiment a set-up feature may be exactly like the feature designed in step 502.

A set-up or designed feature can be scribed in an axisymmetric fashion about the first localized X-Y-Z coordinate axis. For example, a diffractive lens feature may be scribed into a surface of the work piece by beginning an axisymmetric and substantially spiral cutting path at the outside edge of the desired feature and moving the tool along the spiral path with a decreasing radius until the tool reaches the center axis of the desired feature and the unwanted material has been removed. In one such embodiment, continuous chips of waste material are created by such a scribing process using a spiral tool path. Using such a process, the tool (for example, the tool 210 mounted in system 200 as described above with respect to FIG. 2) can be moved with respect to the X- Y-, and C-axes using a dynamic feed rate configured to substantially maintain a target centripetal acceleration along a tool path on the surface of the work piece (such as the work piece 214 described with respect to FIG. 2) in a manner that maintains the a predetermined angle between the tool table at all times during the scribing process in a substantially perpendicular orientation to the translational movement of the tool along the tool path at that same point in time.

In other embodiments, alternative cutting paths, feature shapes or relationships between a tool's cutting surface and the direction of tool movement may be used. For example, a refractive or reflective lens feature may be scribed by beginning a substantially spiral cutting path at the center of the desired feature and moving a radiused-diamond tool along the path with an increasing radius until the tool reaches the outside edge of the desired feature and the unwanted material has been removed from the work piece.

In yet other embodiments, additional machining processes may be used to substantially form a set-up or designed feature, and a scribing process as described with respect to step 512 may then be used as a subsequent process to provide all or part of one or more features with greater dimensional accuracy (for example, to the tens of nanometers), higher surface slopes than can be provided by some other processes (such as with a Fast-Tool Servo process), a smoother finished feature surface comprising fewer tool marks than provided by some other processes (such as a micro milling process), multiple optical or other effects to be provided by a feature (such as both a refractive and diffractive effect on a lens feature), and an easier process of removing any metal chips or other swarf from the finished work piece.

In step 514, the method 500 comprises the step of measuring and correcting form errors. For example, in one embodiment, a set-up feature that has been machined into a scrap work piece may be measured for form errors using an interferometer or other surface profiler device (such as, for example, the Talysurf system available from Taylor Hobson Ltd., PO Box 36, 2 New Star Road, Leicester, LE4 9JQ) to compare the set-up feature's dimensions with the designed dimensions of the feature designed in step 502, and thereby determine the form error of the tool (such as the tool 210) mounted in a CNC machine (such as the system 200 described above). If it is determined that there is a form error in the scribed set-up feature, the form error information can then be used to update the X-Y-Z tool path created in step 504 (for example using functionality in DIFFSYS software), as well as to recalculate any corresponding C-axis coordinates or dynamic feed rate information for the corrected X-Y-Z tool path (for example as described in steps 506 and 507). In this manner the dimensional and positional accuracy in scribing the feature(s) designed in step 502 can be increased. For example, in one embodiment, measuring and correcting for form errors can result in accuracy in the range of tens of nanometers. In one embodiment involving the machining of multiple designed features on a single work piece, the step of measuring and correcting for form errors can be done at one or more times during the machining of the plurality of features to correct for form errors that develop during the course of machining (for example, to account for tool wear). In one embodiment the step of measuring and correcting for form errors may be omitted, for example when accuracy within a few microns of the designed feature's dimensions is acceptable.

Referring still to FIG. 5, in step 516, the method 500 further comprises the steps of indexing the tool used for machining the set-up feature to a second localized X-Y-Z coordinate axis whose location with respect to the first localized X-Y-Z coordinate axis is known. In one embodiment the relationship between the first and second X-Y-Z coordinate axes can be part of a program designed to provide a work piece with multiple features. The second localized X-Y-Z coordinate axis can be associated with the location of a feature designed in step 502 to be machined on the work piece. In one embodiment the work piece that the set-up feature was machined on can be removed and a second work piece can be selected and mounted that is configured to scribed to produce one or more features designed in step 502.

Once the tool has been indexed to the location of the second localized X-Y-Z coordinate axis, the scribing process may be repeated in an axisymmetric manner about the second localized X-Y-Z coordinate axis to create a designed feature (for example, in a manner as described above with respect to step 512). In this manner, multiple designed features (either of the same type and design or of different types or designs) can be machined onto the same work piece without removing either the tool or the work piece from its securely mounted position, thereby allowing for greater dimensional accuracy between features and faster overall machining of an array of features on a single work piece. In some embodiments an indexing and repeated machining process can be used to create more than two features on the same work piece or at the same localized X-Y-Z coordinate axis.

Figure 6:
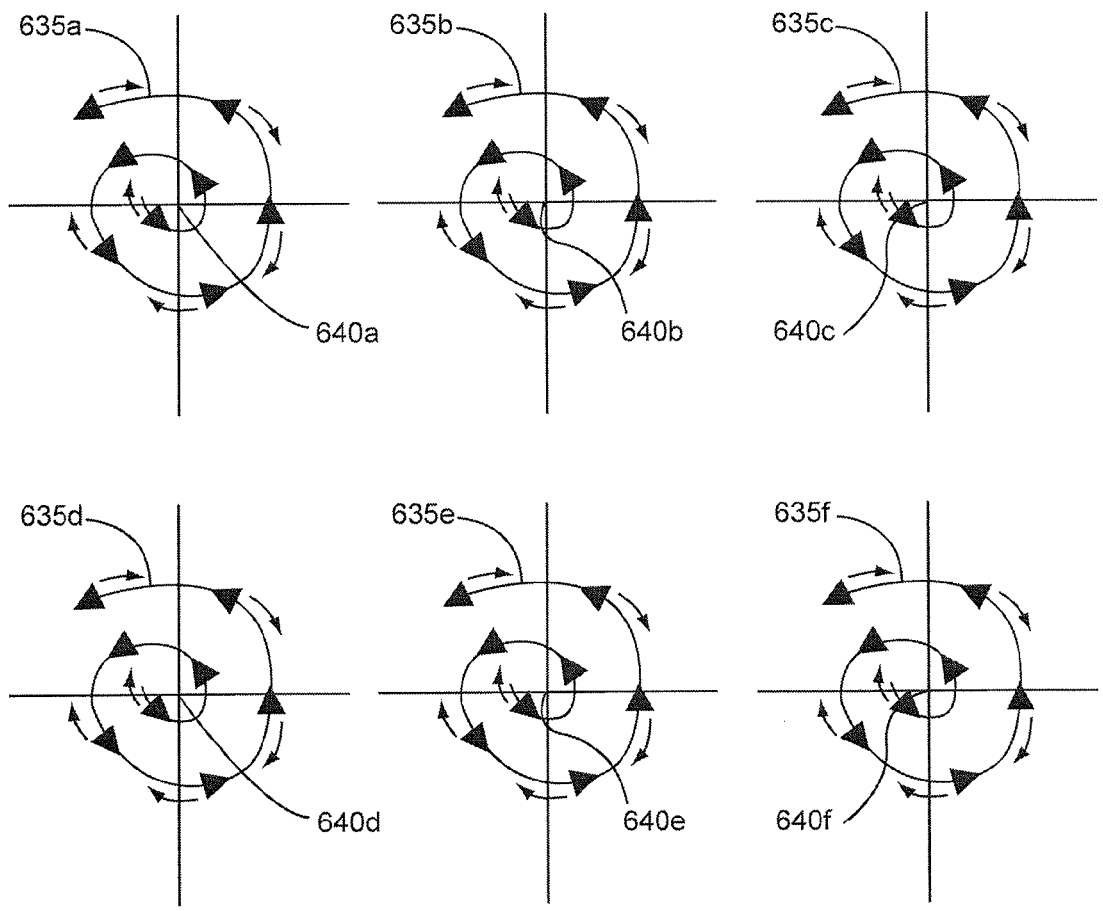
FIG. 6 shows an example array of six spiral tool paths to be machined onto a single work piece according to one embodiment, where each tool path has a localized X-Y-Z-C coordinate axis at its center.

For example, FIG. 6 shows an array of six substantially-identical spiral tool paths $635_{A-F}$ to be followed by a tool when machining six features in an array onto a single work piece according to one embodiment, where each of the six tool paths shown is associated with a unique localized X-Y-Z coordinate axis 640 at the center of a feature to be machined. As shown in FIG. 6, tool path $635_A$ is associated with localized X-Y-Z coordinate axis $640_A$. Similarly, tool path $635_B$ is associated with localized X-Y-Z coordinate axis $640_B$, and so on. In other embodiments a greater or lesser number of features may be designed and programmed to comprise an array of features on a single work piece. In yet other embodiments, more than one feature to be machined may share a common localized X-Y-Z axis. In one such embodiment, a single work piece may be designed to encompass a plurality of groups of features, where each group of features shares a common localized X-Y-Z axis.

Figure 7:
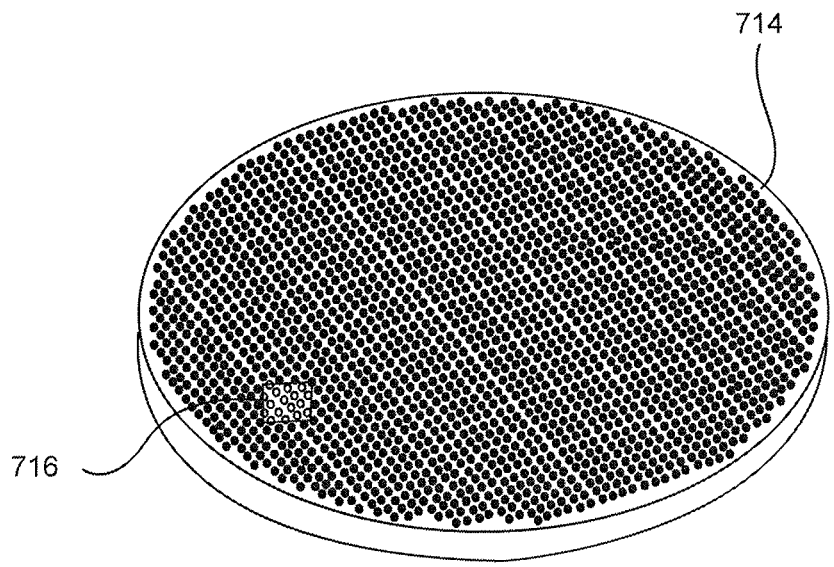
FIG. 7 shows an example work piece that has had an array of identical features machined thereon according to one embodiment.

FIG. 7 shows an example work piece 714 that has had an array of numerous identical features 718 (shown with greater detail in FIG. 8) machined thereon according to one embodiment, where each identical feature results from an identical tool path associated with a unique localized X-Y-Z coordinate axis on the work piece 714 as described above with respect to FIG. 6. The work piece 714 shown in FIGS. 7 and 8 comprises a fabrication master having an eight inch diameter and is comprised of a nickel material that has been designed for use in the production of an array of refractive, reflective, and/or diffractive lenses to be incorporated in miniature image capture devices.

In some embodiments features 718 can comprise reflective optical properties. For example, in one such embodiment concave or convex reflective features can be scribed into an opaque material (for example using the method 500 described above). In other such embodiments a replication master (for example the work piece 714) may be scribed according to the method 500 described above and an opaque material can be used to replicate lenses therefrom, or a transparent material can be used to replicate lenses from a master and an opaque coating material can be applied over at least a portion of one or both sides of a lens fabricated from a transparent material. Other embodiments may be used to fabricate refractive or diffractive optical features 718 from a substantially transparent material, such as glass, or acrylic.

Optical surfaces that may be scribed using the embodiments described herein include concave, convex, spherical, aspherical, and surfaces that are not rotationally symmetric about a localized Z-axis. In other embodiments other types of work pieces may be used (for example, having a different shape, material, or design of features or array thereof).

Figure 8:
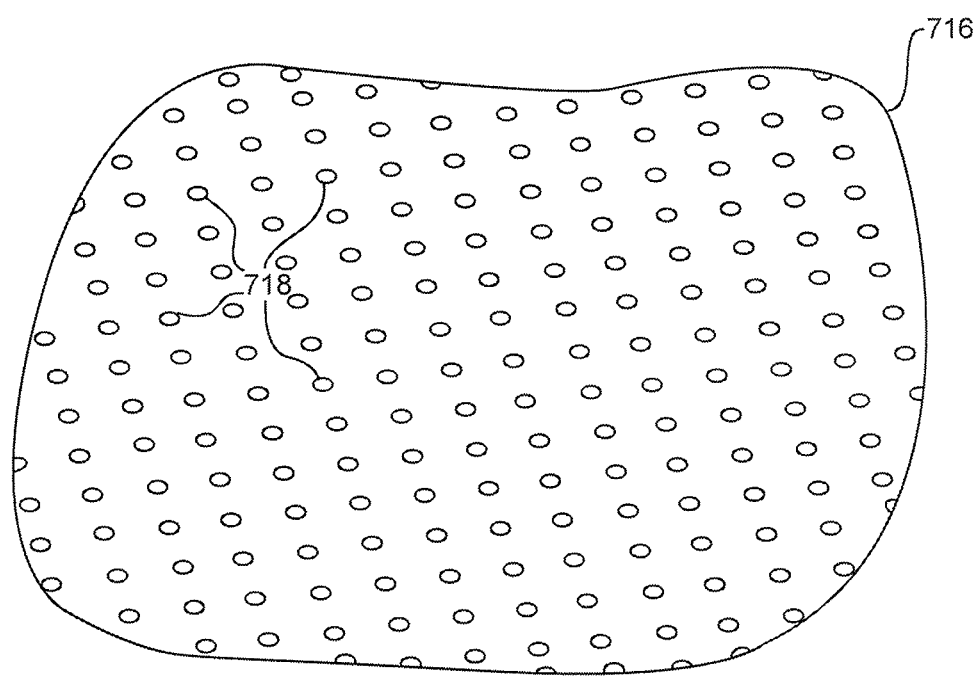
FIG. 8 shows a portion of the work piece shown in FIG. 7 in an enlarged view.

Referring now to FIG. 8, a portion 716 of work piece 714 is shown in an enlarged view. As shown in FIG. 8, a plurality of identical features 718 comprising an array have been machined onto the work piece 714. In other embodiments a greater or lesser number of features may be machined onto a work piece, with greater or lesser distances between each feature. In other embodiments a single work piece 714 may have a plurality of different feature designs machined therein. For example, the work piece 714 may comprise a plurality of 1×4 or 1×12 microlens arrays for use in data communications applications.

Figure 9:
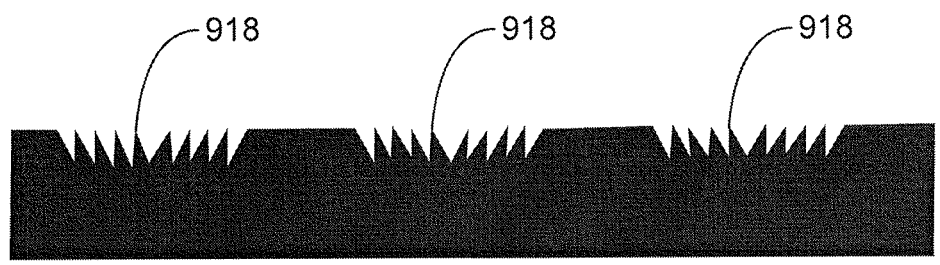
FIG. 9 is a cross-section elevation view of a work piece having diffractive features that have been machined according to one embodiment.

Referring now to FIG. 9, a cross-section elevation view of a work piece 914 having multiple diffractive lens features 918 that have been machined therein is shown according to one embodiment. The features 918 shown in FIG. 9 were scribed into the work piece 914 using a dead sharp single point diamond turning tool. The features 918 shown in FIG. 9 were fabricated according to a scribing method (for example according to the method 500 described above) using a set of spiral tool paths and carried out by a CNC machining system (for example the system 200 described above). The work piece 914 may be comprised of a glass material, for example. In another embodiment, the work piece 914 may comprise a metal fabrication master.

Figure 10:
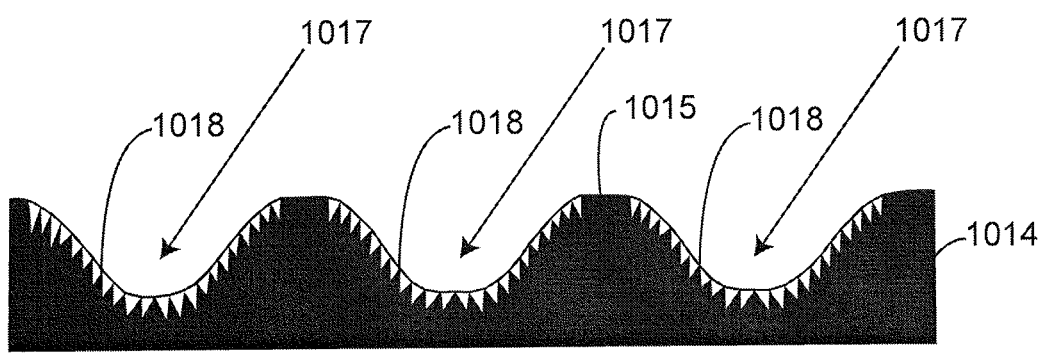
FIG. 10 is a cross-section elevation view of a work piece having refractive-diffractive features that have been machined according to one embodiment.

Similarly, FIG. 10 also shows a cross-section elevation view of a work piece 1014 having multiple features 1018 that have been machined according to one embodiment. The features 1018 shown in FIG. 10 comprise refractive-diffractive lens features. The features 1018 were provided by using a first fabrication process, such as a prior scribing process, a micro-milling process, or a fast tool servo process to remove large amounts of material to create refractive lens features 1017 on the surface 1015 of work piece 1014. The resulting surface 1015 of the work piece 1014 thus has a substantially wavy appearance, on account of the concave lens features 1017, onto which diffractive features 1018 were machined using a dead sharp single point diamond turning tool according to a scribing method (for example the method 500 described above) using a set of spiral tool paths programmed to account for the non-planar surface topography associated with the refractive lens features. The diffractive features 1018 shown in FIG. 10 were machined on the surface 1015 of the work piece 1014 using a CNC machining system (for example the system 200 described above) that accounted for the varying topography of the refractive features 1017 on the surface 1015 as provided by, for example, a fast tool servo process by using a work piece holder platform configured to maintain contact between the tool and the work piece by moving the work piece along the Z-axis. For example, the work piece holder platform 312 as described above with respect to FIG. 3 could be used. In other embodiments a lens feature having both refractive and diffractive properties can be machined using the same process (such as a scribing process as described with respect to FIG. 5) to machine each layer of features, but using a plurality of different tools. In yet another embodiment, a lens feature having both refractive and diffractive properties may be formed using a single scribing process.

Figure 11:
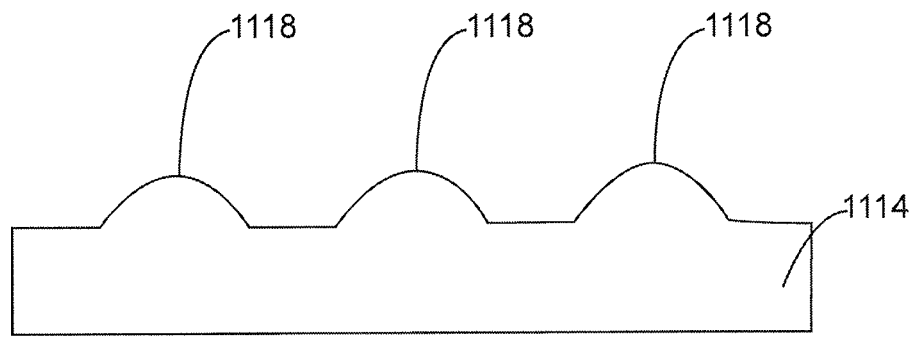
FIG. 11 is a cross-section elevation view of a work piece having convex refractive features that have been machined according to one embodiment.
Figure 12:
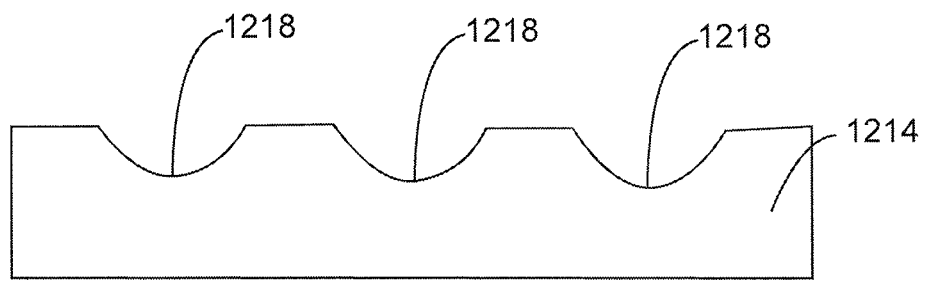
FIG. 12 is a cross-section elevation view of a work piece having concave refractive features that have been machined according to one embodiment.

FIGS. 11 and 12, respectively, show cross-section elevation views of work pieces 1114, 1214 having multiple refractive features 1118, 1218 that have been machined according to one embodiment. In the embodiment shown in FIG. 11, the refractive features 1118 are convex. By comparison, in the embodiment of FIG. 12, the refractive features 1218 are concave. Both types of refractive optical surfaces (features 1118 shown in FIG. 11 or features 1218 shown in FIG. 12) can be fabricated according to a scribing method (for example according to the method 500 described above) using a set of spiral tool paths and carried out by a CNC machining system (for example the system 200 described above).

Figure 13:
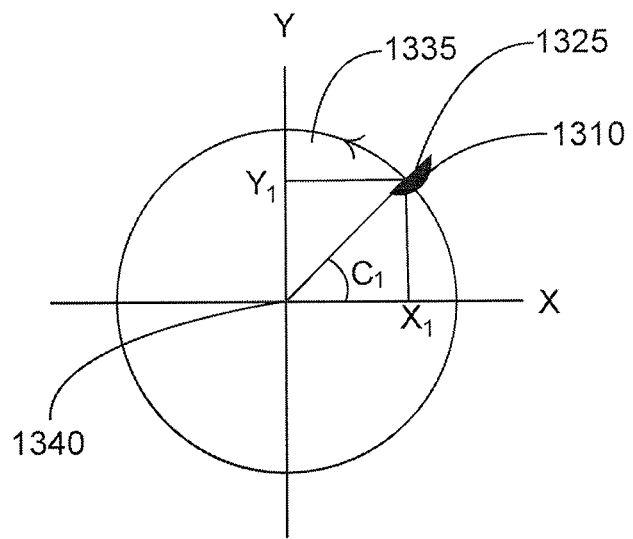
FIGS. 13 and 14 show plan views of a tool at two different positions along a tool path during a scribing operation according to one embodiment.
Figure 14:
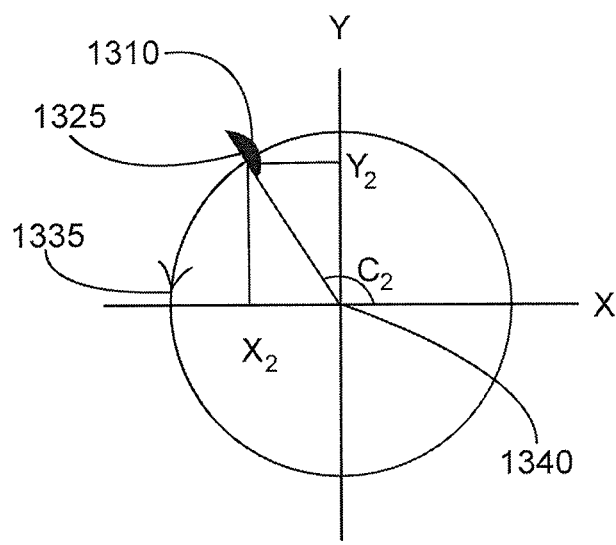

Referring now to FIGS. 13 and 14, plan views of a tool 1310 at two different positions along a substantially-circular counter-clockwise tool path 1335 with respect to a localized X-Y-Z coordinate axis 1340 during a scribing operation according to one embodiment are shown. As shown in FIG. 13, the tool 1310 is located at a first position $X_1, Y_1$ along the tool path 1335. As shown in FIG. 11, the first position $X_1, Y_1$ defines an angle $C_1$ about the C-axis. Accordingly, the tool 1310 has been rotated into a position as shown whereby the tool's 1310 cutting surface (tool table) 1325 is substantially perpendicular to the tool's 1310 translational movement along the cutting path 1335. In one such embodiment the tool 1310 may comprise a radiused or dead sharp single point natural or synthetic diamond cutting element configured to be used in single point diamond turning (SPDT) operations. The tool 1310 may be mounted in a system (such as the system 300 described above with respect to FIG. 3) that is configured to control the position of the tool along the X-, Y-, and C-axes.

As shown in FIG. 14, the tool 1310 is located at a second position $X_2, Y_2$ along the tool path 1335. As shown in FIG. 14, the second position $X_2, Y_2$ defines an angle $C_2$ about the C-axis. Accordingly, the tool 1310 has been rotated into a position as shown whereby the tool's 1310 cutting surface (tool table) 1325 is substantially perpendicular to the tool's 1310 translational movement along the cutting path 1335. In the embodiment shown in FIGS. 13 and 14, as the tool 1310 traverses the complete circular cutting path 1335, the tool 1310 also completes a full 360 degree rotation about the C-axis. Thus, in the embodiment shown in FIGS. 13 and 14, there is a correlated 1:1 relationship between the trajectory of the tool 1310 along the tool path 1335 about the localized Z-axis and the rotation of the tool 1310 about the C-axis. In the embodiment shown, since tool 1310 rotation speeds and the speed of the tool 1310 relative to the work piece are relatively low (one or more orders of magnitude slower than a comparable micro-milling process), heat generation, along with the concurrent problems arising from heated tools and work pieces, is minimized.

In other embodiments, a scribing process may provide for rotation of a tool (such as the tool 1310 shown in FIGS. 13 and 14) to be rotated into a position such that the tool's 1310 cutting surface (tool table) 1325 is at an angle other than perpendicular to the tool's 1310 translational movement along a cutting path at that point in time, in order to provide for specific features, work piece surface topologies, or types or profiles of tools involved.

Figure 15:
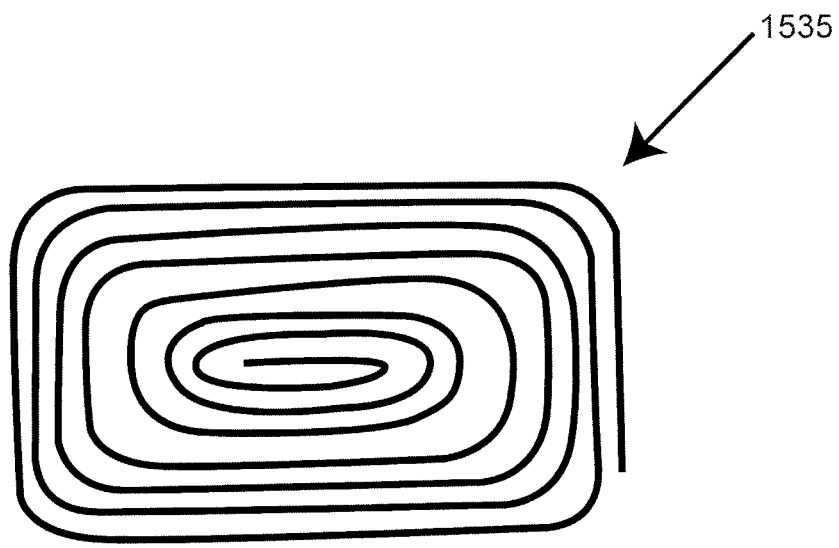
FIG. 15 shows an example rectangular tool path with radiused corners.

In yet other embodiments, a scribing process may be used in conjunction with non-axisymmetric tool paths to create one or more non-axisymmetric features. For example, FIG. 15 shows a non-axisymmetric rectangular tool path 1535 comprising radiused corners. In one such embodiment, the dynamic feed rate of a cutting tool along at least a portion of the non-axisymmetric tool path 1535 can be varied as described above with respect to step 507 of FIG. 5 to maintain substantially the same centripetal acceleration of the tool's cutting surface with respect to the work piece along the tool path 1535.

General

The foregoing description of embodiments has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A method for machining a feature on a work piece along a curving tool path, comprising:
    controlling a relative translational movement between a tool table and the work piece along the curving tool path, comprising controlling a dynamic feed rate of the tool table along the curving tool path to substantially maintain a target centripetal acceleration of the tool table with respect to the work piece;
    controlling a corresponding angle of rotation of the tool table with respect to the work piece to maintain a substantially constant angle between the tool table and the corresponding relative translational movement between the tool table and the work piece along the curving tool path; and
    determining the dynamic feed rate of the tool table at a plurality of positions along the curving tool path based on a set of coordinates defining the plurality of positions along the curving tool path.

2. The method of claim 1, wherein the substantially constant angle comprises a perpendicular relationship.

3. The method of claim 1, further comprising:
    determining the corresponding angle of rotation of the tool table at a plurality of positions along the curving tool path based on a set of coordinates defining the plurality of positions along the curving tool path.

4. The method of claim 1, wherein the target centripetal acceleration comprises a constant centripetal acceleration.

5. The method of claim 1, further comprising:
    determining the dynamic feed rate of the tool table at a plurality of positions along the curving tool path based on a plurality of radii of curvatures along the curving tool path.

6. The method of claim 1, wherein the curving tool path comprises a spiral tool path.

7. The method of claim 1, wherein the curving tool path comprises a rectangular tool path comprising a radiused corner.

8. The method of claim 1, wherein the curving tool path is substantially axisymmetric about a first localized coordinate axis on the work piece.

9. The method of claim 8, wherein the feature comprises a lens feature and the curving tool path further comprises a substantially spiral tool path beginning at the outside edge of the lens feature, following the substantially spiral path with a decreasing radius, and ending at the center of the first localized coordinate axis.

10. The method of claim 1, wherein the feature comprises a refractive lens feature.

11. The method of claim 1, wherein the feature comprises a diffractive lens feature.

12. The method of claim 1, wherein the feature comprises a refractive-diffractive lens feature.

13. The method of claim 12, wherein the work piece comprises a previously-machined refractive lens feature and the refractive-diffractive lens feature is provided by machining a diffractive lens feature onto the work piece such that the diffractive lens feature overlaps at least a portion of the refractive lens feature.

14. The method of claim 1, wherein the method is carried out using a CNC machining apparatus.

15. The method of claim 1, further comprising indexing the tool table at a plurality of localized coordinates to machine a plurality of features in an array onto the work piece.

16. A method for machining a feature on a work piece along a curving tool path, comprising:
controlling a relative translational movement between a tool table and the work piece along the curving tool path, comprising controlling a dynamic feed rate of the tool table along the curving tool path to substantially maintain a target centripetal acceleration of the tool table with respect to the work piece; and
controlling a corresponding angle of rotation of the tool table with respect to the work piece to maintain a substantially constant angle between the tool table and the corresponding relative translational movement between the tool table and the work piece along the curving tool path,
wherein the curving tool path is substantially axisymmetric about a first localized coordinate axis on the work piece, and
wherein the feature comprises a lens feature and the curving tool path further comprises a substantially spiral tool path beginning at the outside edge of the lens feature, following the substantially spiral path with a decreasing radius, and ending at the center of the first localized coordinate axis.

17. A method for machining a feature on a work piece along a curving tool path, comprising:
controlling a relative translational movement between a tool table and the work piece along the curving tool path, comprising controlling a dynamic feed rate of the tool table along the curving tool path to substantially maintain a target centripetal acceleration of the tool table with respect to the work piece; and
controlling a corresponding angle of rotation of the tool table with respect to the work piece to maintain a substantially constant angle between the tool table and the corresponding relative translational movement between the tool table and the work piece along the curving tool path,
wherein the feature comprises a refractive-diffractive lens feature, and
wherein the work piece comprises a previously-machined refractive lens feature and the refractive-diffractive lens feature is provided by machining a diffractive lens feature onto the work piece such that the diffractive lens feature overlaps at least a portion of the refractive lens feature.

18. A method for machining a feature on a work piece along a curving tool path, comprising:
controlling a relative translational movement between a tool table and the work piece along the curving tool path, comprising controlling a dynamic feed rate of the tool table along the curving tool path to substantially maintain a target centripetal acceleration of the tool table with respect to the work piece;
controlling a corresponding angle of rotation of the tool table with respect to the work piece to maintain a substantially constant angle between the tool table and the corresponding relative translational movement between the tool table and the work piece along the curving tool path; and
indexing the tool table at a plurality of localized coordinates to machine a plurality of features in an array onto the work piece.

19. The method of claim 18, wherein each of the plurality of features in the array comprises the same feature.

20. The method of claim 18, wherein the plurality of features in the array are machined without removing either the tool table or work piece from a securely mounted position.

21. The method of claim 18, wherein the substantially constant angle comprises a perpendicular relationship.

22. The method of claim 18, further comprising:
determining the corresponding angle of rotation of the tool table at a plurality of positions along the curving tool path based on a set of coordinates defining the plurality of positions along the curving tool path.

23. The method of claim 18, further comprising:
determining the dynamic feed rate of the tool table at a plurality of positions along the curving tool path based on a set of coordinates defining the plurality of positions along the curving tool path.

24. The method of claim 18, further comprising:
determining the dynamic feed rate of the tool table at a plurality of positions along the curving tool path based on a plurality of radii of curvatures along the curving tool path.

* * * * *